United States Patent [19]

Bissar et al.

[11] 4,227,779

[45] Oct. 14, 1980

[54] HERMETIC SEAL FOR ELECTROCHROMIC DISPLAY

[75] Inventors: Saadi Bissar; Douglas George, both of Waterbury, Conn.

[73] Assignee: Timex Corporation, Waterbury, Conn.

[21] Appl. No.: 28,141

[22] Filed: Apr. 9, 1979

[51] Int. Cl.³ ............................................. G02F 1/17
[52] U.S. Cl. ..................................... 350/357; 156/145; 350/355
[58] Field of Search ............... 350/357, 355, 356, 362, 350/363, 343; 156/107, 109, 145; 29/570

[56] References Cited

U.S. PATENT DOCUMENTS

| | | | |
|---|---|---|---|
| 4,007,077 | 2/1977 | Yaguchi | 156/145 |
| 4,116,546 | 9/1978 | Leibowitz | 350/357 |

OTHER PUBLICATIONS

Kirkman et al., "Sealing a Flat Display Device", *IBM Technical Disclosure Bulletin*, vol. 21, No. 7, Dec. 1978, pp. 3021-3022.

*Primary Examiner*—James W. Davie
*Attorney, Agent, or Firm*—Edward J. Timmer

[57] ABSTRACT

Disclosed is an improved sealant useful with electrochromic or similar type displays having an acidic electrolyte hermetically sealed between spaced substrates, the sealant providing an inner seal chemically formed in situ at the interface with the electrolyte by reaction therewith and an outer seal surrounding the inner seal. The sealant preferably comprises a mixture of acid resistant epoxy resin and a curing agent, for example, amine or amide, the curing agent reacting with the acidic electrolyte at the interface to form a water-repellant reaction product constituting the inner seal and also reacting at remaining areas of the sealant surrounding the interface to cure the epoxy resin and thereby form the outer seal. In the inventive method, the sealant is at the most only partially cured prior to introduction of the electrolyte into the display so that there is some free curing agent present to react with the electrolyte at the interface and form the inner seal.

16 Claims, 2 Drawing Figures

HERMETIC SEAL FOR ELECTROCHROMIC DISPLAY

FIELD OF THE INVENTION

The present invention relates to electro-optic displays and, more particularly, to displays of the electrochromic or similar type characterized as having an electrolyte hermetically sealed between spaces substrates.

DESCRIPTION OF THE PRIOR ART

Electrochromic displays are well known in the art and typically comprise a front substrate with selectively actuable transparent electrodes and image-forming electrochromic layers thereon, a rear substrate spaced from the front substrate having a counter electrode thereon and an electrolyte layer between the substrates. Typically, the electrolyte is hermetically sealed between the substrates by applying a bead or layer of sealant between peripheral portions of the substrates.

One type of sealant which has been employed in the past includes a mixture of epoxy resin and a curing agent such as polyamine. Polyethylene, polypropylene and "Kynar" have also been utilized either alone or sometimes in combination with the aforementioned epoxy resin mixtures. Typically, the epoxy sealant is applied in the desired pattern to one or both of the substrates and the substrates are then clamped together with or without a gasket. The assembly is then heated at elevated temperatures; e.g. 40° C. to 100° C. and possibly above for selected times, to completely cure the sealant by reaction of the curing agent with the epoxy resin. After curing, the display is filled with electrolyte through one or more fill ports in the substrates and then the ports are sealed by insertion of a gold or polyethylene ball followed by the application of a fast curing (room temperature) epoxy sealant thereover.

This sealing technique is disadvantageous for several reasons. For example, it has been found that heating of the display to completely cure the sealant adversely affects subsequent performance of the display. One aspect of this effect is thought to be the loss of water from the electrochromic layers during heating, the water loss causing significantly reduced switching speeds. Another aspect of this effect is the discharging of hydrogen from the counter electrode if prewritten or precharged with hydrogen as hydrogen tungsten bronze. Still another aspect is thought to be the spreading of the sealant over portions of the substrate electrochromic layers during heating and the destruction thereof resulting from contact with the curing agent in the sealant. A further disadvantage of this technique is that only one seal of cured epoxy resin is provided. If this seal exhibits high permeability to gases or liquids for some reason or actually develops leaks, there is no second, back-up seal upon which to rely. The fact that many electrochromic displays use acidic electrolytes aggravates the situation since over time the electrolyte can attack certain sealants, resulting in permeability and leakage.

Generally, the sealant for an electrochromic or similar display should possess the following combination of properties:

(a) good adherence to both substrates
(b) sufficient flexibility and rigidity to withstand thermal expansion of the substrates and electrolyte
(c) resistance to corrosive effects of the electrolyte
(d) low permeability against penetration by the electrolyte from the inside and by gases or liquids from the outside.

And, of course, it would be highly desirable to provide a double rather than single seal around the display to enhance sealant reliability over long periods of display operation.

SUMMARY OF THE INVENTION

Accordingly, the present invention provides an improved hermetic sealant possessing these and other features and advantages, the sealant being especially useful with electrochromic or other types of electro-optic displays having an acidic electrolyte hermetically sealed between spaced substrates. A method for hermetically sealing these types of displays is also provided.

In a typical embodiment of the invention, the improved sealant is disposed between spaced substrates carrying electrode means to define a cell therebetween in which an acidic electrolyte is contained. An important feature of the invention is that the sealant provides an inner seal chemically formed in situ at the interface with the electrolyte by reaction therewith and an outer seal surrounding the inner seal. Typically, the improved sealant comprises a mixture of acid resistant epoxy resin and a curing agent, preferably an amine or amide, which reacts with the electrolyte at the interface to form a water repellant compound; e.g. water repellant amino or amide salts in the case of the preferred curing agents, the compound forming the inner seal, and which curing agent also reacts with the epoxy resin at remaining areas in the sealant surrounding the interface to cure the resin and thereby form the outer seal. The sealant of the invention is also useful in hermetically sealing the fill port in such electro-optic displays with or without the use of a plug of gold, polypropylene, polyethylene and the like.

An important feature of the method of the invention is that the sealant is at the most only partially cured prior to introduction of the acidic electrolyte into the cell. Partial curing imparts sufficient strength to the sealant to contain the electrolyte and yet leaves some free, unreacted curing agent present in the sealant. It is this free curing agent which subsequently reacts with the electrolyte at the interface to form the inner seal and with the remaining uncured epoxy resin at other areas surrounding the interface during a subsequent curing step to form the outer seal. Preferably, partial curing of the sealant before introduction of electrolyte into the cell is conducted at room temperature.

DRAWINGS

Other objects and advantages of the invention may be seen from the following description when viewed in conjunction with the accompanying drawings wherein.

DESCRIPTION OF THE PREFERRED EMBODIMENTS

Figure 1:
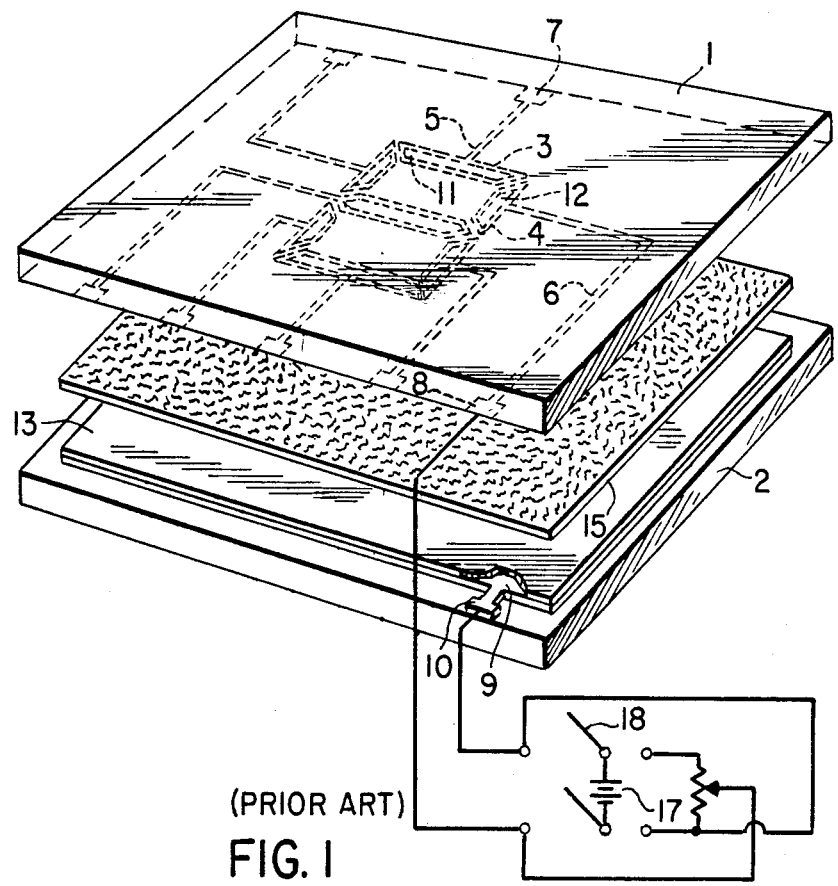
FIG. 1 is an exploded perspective view of a conventional electrochromic display.

Referring now to FIG. 1 of the drawings, a conventional electrochromic display having a sandwich construction of a first transparent substrate 1 and a second spaced substrate 2, which need not be transparent, and electrolyte layer 15 therebetween is shown. Substrate 1 has a conductive pattern of transparent metal oxide electrodes on the underside thereof, such as segments 3,4 of a pattern which can be selectively actuated to form digits or other optical patterns via conductive leads 5,6 leading to terminals 7,8. Substrate 1 may be made of transparent glass or plastic with a selected pattern of transparent electrodes 3,4 thereon of a metal oxide, preferably tin oxide admixed with a dopant such as antimony to increase conductivity. The pattern may be etched on the substrate by using commercially available material known as NESA glass and removing the conductive coating except for electrodes 3,4.

The second substrate has a conductive counter electrode 9 thereon. Substrate 2 may be made of glass, ceramic or plastic coated with a suitable conductive layer to form counter electrode 9 connected to terminal 10. Coated on the transparent electrode segments 3,4 and also on counter electrode 9, if desired, are layers of electrochromic material indicated as 11, 12, 13. The electrochromic layers 11, 12 on segments 3,4 respectively, are applied by suitable masking techniques to cover a smaller area than the electrodes so as to give good edge definition.

Electrolyte layer 15 is acidic in nature and may take various forms including liquid electrolytes such as dilute or concentrated aqueous or organic solutions of sulfuric acid, gelled electrolytes such as sulfuric acid mixed with glycol or glycerine and paste electrolytes such as metal oxide pigment wetted with mineral acid; e.g. sulfuric or phosphoric. These and other types of acidic electrolytes are well known in the art; for example as illustrated in U.S. Pat. Nos. 3,704,057 to Beegle; 3,521,941 to Deb et al; 3,827,784 to Giglia et al; 3,840,287 to Witzke et al; 3,957,352 to Leibowitz; 3,995,943 to Jasinski and 4,009,036 to Kasia. However, a preferred acidic electrolyte for use in the present invention involves a layer of the acid form of soluble polystyrene sulfonic acid polymer chemically wetted with water or a layer of soluble perfluorosulfonic acid polymer chemically wetted with water. Preferred soluble polystyrene sulfonates are marketed by National Starch and Chemical Corporation under the registered trademark VERSA-TL; e.g. VERSA-TL 71, VERSA-TL 20 series, VERSA-TL 70 Series, VERSA-TL 400 series, VERSA-TL 500 series, VERSA-TL 700 series and the like. These preferred acidic electrolytes are described more fully in the Leibowitz U.S. Pat. No. 4,116,546 issued Sept. 26, 1978 of common assignee herewith. Other shorter chain organics such as adipic, dodecanedioic, stearic, palmitic and oleic acids may also find use in the invention.

Figure 2:
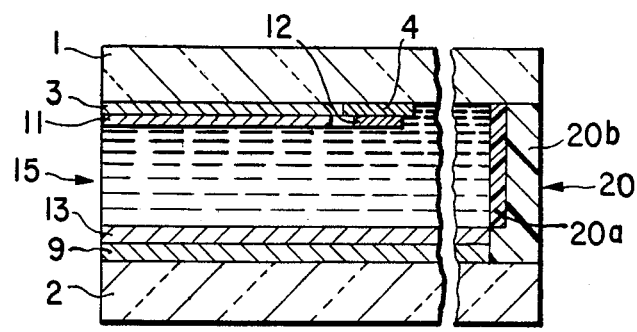
FIG. 2 is an enlarged cross-sectional view of the inventive display showing the sealant with the chemically formed inner seal and outer seal therearound.

Reference to FIG. 2 shows an assembled display of the invention. The two substrates are attached to one another by the sealant 20 of the invention to be described more fully hereinafter. Suitable well known means for actuating the display element includes means for applying an electric field from battery 17 to a selected segment 4 via terminal 8 and counter electrode 9 via terminal 10. Means for reversing the polarity of the applied voltage to erase the image is indicated symbolically by a double-pole double throw switch 18.

As shown in FIG. 2, the sealant 20 of the invention provides an inner seal 20a chemically formed at the interface with electrolyte 15 by reaction therewith and an outer seal 20b surrounding the inner seal. The sealant comprises an acid resistant epoxy resin, preferably diglycidil ether of bis-phenol A epoxide type, and a preselected curing agent which will react with the acidic electrolyte at the interface to form a water repellant compound which constitutes the inner seal 20a. Preferably, the curing agent selected for the sealant is an amine or amide, including polyamines or polyamides, so that with the preferred electrolyte of soluble polystyrene sulfonic acids, the water repellant compound formed and comprising inner seal 20a is a mucous, water-repellant amino or amido polystyrene sulfonate salt. Since commercially available soluble polystyrene sulfonic acids include some small quantity of sulfuric acid therein as an impurity, amino or amido sulfates may also be formed at the sealant-electrolyte interface and be included within the water repellant compound providing the inner seal. If mineral acids such as sulfuric or phosphoric are used alone, amino or amido sulfacts or phosphates would form the inner seal 20a. The preferred amine or amide curing agents useful in the invention are available commercially from, for example, Ciba Geigy Corporation under the designation curing agent 815, 825 and 840 or Shell Oil Company under the designation V 15 and V 25. Preferably the curing agent is a combination of one of these aforementioned compounds, especially curing agent 825 with EMI 24 (available from Houdry Process and Chemical Co.)or preferably isophoron diamine which is a liquid curing agent available from the Hugo Stinnes Chemical Company. Epoxy resins of the acid resistant type are available from Ciba Geigy Corporation under the trademark Araldite or Shell Oil Company under the trademark EPON chosen with suitable viscosity for silk screening; e.g. Araldite 6020 and Epon 828.

The present invention provides a novel sealing procedure in order that the inner seal 20a can be chemically formed at the interface with the electrolyte layer 15 and then the outer seal 20b can be formed around the inner seal. The display assembly procedure typically involves applying a bead or layer of the sealant to one or both of the substrates 1 and 2 in a desired pattern by silk screening, each substrate having been previously provided with suitable electrode means such as metal oxide electrodes 3,4 and counter electrode 9 with electrochromic layers 11, 12, 13 thereon, FIGS. 1 and 2. After the sealant is applied, the substrates are assembled in spaced working relation from one another as shown in FIG. 2 with the sealant defining a cell between the substrates to receive the acidic electrolyte 15. Thereafter, the sealant is partially cured at preferably room temperature for from 12 hours to about 6 days to impart sufficient strength to the sealant to hold the display together and receive electrolyte. However, it is important that the sealant by only partially cured so that some of the curing agent remains in the free unreacted condition for subsequent reaction with electrolyte 15. If the sealant is fully cured, there will be no free curing agent to react with the electrolyte and form the inner seal 20a. This step of the inventive process is notably different from prior art sealing methods which fully cure the sealant prior to introduction of the electrolyte into the display cell. Room temperature is preferred for the partial curing stage since the degree of curing can be more easily controlled and since the electrochromic layers 11, 12, 13 will not suffer a water loss which can harm the functioning of the display. In addition, there is no spreading of the sealant over these layers and thus no harmful reaction between the curing agent and electrochromic material. After the partial curing step, the electrolyte 15 is introduced into the display through suitable access means such as a fill port or other opening and begins to react with the sealant at the interface to form inner seal 20a. Typically, the display will be allowed to sit for at least 1 to 3 hours before final curing to form the inner seal, in practice usually for 24 hours to ensure that the fill hole sealant is fully cured. Thereafter, the sealant is completely cured at areas surrounding the inner seal to form outer seal 20b. The final curing step may be conducted at room temperature for about 7 days or at higher temperatures for shorter times. Druing this final curing step, the free, unreacted curing agent present at these surrounding areas reacts with any uncured epoxy resin to form the outer seal 20b. The outer seal thus comprises completely cured epoxy resin. Thus, a double hermetic seal is provided with the water repellent inner seal, for example, the inner seal comprising amino or amido polystyrene sulfonate and/or sulfate salts, and the outer seal of cured acid resistant epoxy.

When gelled or paste electrolytes are to be employed in the display, it is advisable to conduct partial curing of the sealant mixture before the substrates are placed together in spaced working relation so that the sealant has enough structural integrity to prevent the gelled or paste electrolyte from being forced through the sealant as a result of the pressure applied.

Of course, those skilled in the art will recognize that the display can be batch processed as described for example in the Yasutake U.S. Pat. No. 4,094,058 issued June 13, 1975 rather than individually processed as described hereinabove.

The sealant of the invention can also be used with or without a conventional plug or the like to hermetically seal the fill port or other or other opening through which the electrolyte is introduced. The inner seal and outer seal will be formed in a manner similar to that described above except that no partial curing step is provided.

The invention will be illustrated in more detail by way of the following examples:

EXAMPLE I

The sealant mixture comprises 10.0 grams epoxy resin Alradite 6020 manufactured by Ciba Geigy, about 2.0 grams polyamide 825 manufactured by Ciba Geigy and about 0.05 grams isophoron diamine manufactured by Hugo Stinnes Chemical Company.

The sealant was applied to one of the substrates by silk screening and then the substrates were placed in spaced relation with the sealant therebetween. The sealant was partially cured at room temperature for about 16 hours. Then, electrolyte in the form of VERSA-TL 121 (20–30% acid) was introduced and the fill port plugged. The fill display was allowed to sit for 6 days at room temperature to cure the plug and form the outer seal. A hermetic double seal was thereby provided.

In the above example, the sealant mixture could likewise be used to seal the fill hole after introduction of the electrolyte. In this event, care should be taken to ensure that the fill hole seal is completely cured before subjecting the display to heat.

While there has been described what is considered to be the preferred embodiments of the invention, other modifications will occur to those skilled in the art and it is desired to cover in the appended claims all such modifications as fall within the true spirit and scope of the invention.

We claim:

1. In an electro-optic display having spaced substrates carrying electrode means, a hermetic sealant between portions of the substrates defining a cell therebetween and an electrolyte in the cell,
   an improved hermetic sealant providing an inner seal chemically formed in situ at the interface with the electrolyte by reaction therewith and an outer seal surrounding the inner seal, said sealant comprising a mixture of epoxy resin and a curing agent which reacts with the electrolyte at the interface to form a water repellant reaction product, said reaction product forming the inner seal, and which curing agent also reacts with the epoxy resin at areas of the sealant surrounding the interface to cure said resin and thereby form the outer seal.

2. The display of claim 1 wherein the electrolyte is acidic.

3. The display of claim 2 wherein the curing agent of the sealant is selected from at least one of an amine and amide to form respective amino or amido salts by reaction with the acidic electrolyte, said salts forming the inner seal.

4. The display of claim 1 wherein the electrode means carried by the substrates include electrochromic material for image-display purposes.

5. In an electro-optic display having spaced substrates carrying electrode means, a hermetic sealant between portions of the display defining a cell and an acidic electrolyte in the cell,
   an improved sealant providing an inner seal chemically formed in situ at the interface with the electrolyte by reaction therewith and an outer seal surrounding the inner seal, said sealant comprising a mixture of acid resistant epoxy resin and a curing agent selected from at least one of an amine and amide which reacts with the acidic electrolyte at the interface to form respective water repellant amino or amido salts, said salts forming the inner seal, and which curing agent also reacts at areas of the sealant surrounding the interface to cure said resin and thereby form the outer seal.

6. The display of claim 5 wherein the acidic electrolyte is a polystyrene sulfonic acid polymer chemically wetted with water, whereby the salts formed by reaction of the curing agent and electrolyte are respective amino or amide polystyrene sulfonates.

7. The display of claim 5 wherein the electrolyte includes a mineral acid, whereby the salts formed by reaction of the curing agent and electrolyte are respective amino or amido salts.

8. The display of claim 5 wherein the electrode means carried on the substrates include electrochromic material for image-display purposes.

9. In an electrochromic display having spaced substrates carrying an electrode and electrochromic layer thereon, a hermetic sealant between portions of the substrates to define a cell and a soluble polystyrene sulfonic acid polymer chemically wetted with water in the cell as an electrolyte,
   an improved sealant providing an inner seal chemically formed in situ at the interface with the electrolyte by reaction therewith and an outer seal surrounding the inner seal, said sealant comprising a mixture of acid resistant epoxy resin and a curing agent selected from at least one of an amine and amide which reacts with the electrolyte at the interface to form respective water repellant amino or amido polystyrene sulfonate salts, said salts forming the inner seal, and which curing agent also reacts at areas of the sealant surrounding the interface to cure said resin and thereby form the outer seal.

10. In hermetically sealing an electro-optic display wherein sealant is applied to at least one of two substrates to define a cell therebetween and acidic electrolyte is introduced into the cell, the improved steps of:
(a) applying to said substrate a sealant comprising a mixture of acid resistant epoxy resin and a curing agent which is reactive with the electrolyte to form water repellant salts;
(b) chemically forming an inner seal in situ at the interface between the sealant and electrolyte by introducing electrolyte into the cell prior to the sealant being completely cured so that some curing agent is free to react with the electrolyte and form said water repellant salts, said salts comprising the inner seal; and
(c) forming an outer seal surrounding the chemically-formed inner seal by completely curing areas of the sealant surrounding the inner seal.

11. The sealing method of claim 10 wherein the sealant is partially cured prior to introducing the electrolyte into the cell, thereby leaving some free, unreacted curing agent in the sealant for subsequent reaction with the electrolyte.

12. The sealing method of claim 11 wherein said partial curing is effected at ambient temperature.

13. The sealing method of claim 10 wherein the curing agent of the sealant is selected from at least one of an amine or amide so that respective amino or amido salts are formed by reaction with the electrolyte and constitute said inner seal.

14. In an electro-optic display having a fill port through which an electrolyte is introduced into the display.
an improved fill port sealant providing an inner seal chemically formed in situ at the interface between the sealant and electrolyte and an outer seal surrounding the inner seal, said sealant comprising a mixture of an epoxy resin and a curing agent which reacts with the electrolyte at the interface to form a water repellant reaction product, said reaction product forming the inner seal, and which curing agent also reacts with the epoxy resin at areas of the sealant surrounding the interface to cure said resin and thereby form the outer seal.

15. The display of claim 14 wherein the electrolyte is acidic.

16. The display of claim 15 wherein the curing agent of the sealant is selected from at least one of an amine and amide to form respective amino or amido salts by reaction with the acidic electrolyte, said salts forming the inner seal.

* * * * *